United States Patent
Logiudice

(10) Patent No.: US 9,237,624 B2
(45) Date of Patent: Jan. 12, 2016

(54) LED DRIVER WITH COMPENSATION OF THERMALLY INDUCED COLOR DRIFT

(71) Applicant: Infineon Technologies AG, Neubiberg (DE)

(72) Inventor: Andrea Logiudice, Padua (IT)

(73) Assignee: Infineon Technologies AG, Neubiberg (DE)

( * ) Notice: Subject to any disclaimer, the term of this patent is extended or adjusted under 35 U.S.C. 154(b) by 633 days.

(21) Appl. No.: 13/629,255

(22) Filed: Sep. 27, 2012

(65) Prior Publication Data

US 2013/0076250 A1 Mar. 28, 2013

(30) Foreign Application Priority Data

Sep. 27, 2011 (EP) .................................. 11182843

(51) Int. Cl.
| | |
|---|---|
| *H05B 37/02* | (2006.01) |
| *H05B 33/08* | (2006.01) |
| *G06F 7/60* | (2006.01) |

(52) U.S. Cl.
CPC ............ *H05B 33/0872* (2013.01); *G06F 7/602* (2013.01); *H05B 33/086* (2013.01); *H05B 33/0818* (2013.01); *H05B 33/0824* (2013.01); *H05B 33/0866* (2013.01); *Y02B 20/347* (2013.01)

(58) Field of Classification Search
USPC ......... 315/112–113, 117, 118, 149–159, 291, 315/224, 307–30
See application file for complete search history.

(56) References Cited

U.S. PATENT DOCUMENTS

| | | | |
|---|---|---|---|
| 5,559,514 A | 9/1996 | Thomson | |
| 6,441,558 B1 * | 8/2002 | Muthu et al. .................. | 315/149 |
| 7,999,491 B2 * | 8/2011 | Peng et al. ..................... | 315/291 |
| 8,400,071 B2 * | 3/2013 | Gaines et al. ................. | 315/247 |
| 2003/0011355 A1 | 1/2003 | Skerritt et al. | |
| 2007/0257642 A1 | 11/2007 | Xiao et al. | |
| 2008/0215279 A1 | 9/2008 | Salsbury et al. | |
| 2010/0079074 A1 | 4/2010 | Godbole | |
| 2010/0207793 A1 * | 8/2010 | Ignjatovic et al. ............ | 341/131 |
| 2010/0231132 A1 | 9/2010 | Logiudice et al. | |
| 2012/0119930 A1 * | 5/2012 | Kumar et al. ................. | 341/118 |

FOREIGN PATENT DOCUMENTS

WO 2009035493 A1 3/2009

* cited by examiner

*Primary Examiner* — Douglas W Owens
*Assistant Examiner* — James H Cho
(74) *Attorney, Agent, or Firm* — Slater & Matsil, L.L.P.

(57) ABSTRACT

A circuit arrangement includes a number of light emitting diodes emitting light of different colors arranged adjacent to each other for additive color mixing to provide a desired color. A temperature sensing circuit is configured to provide a temperature signal representing temperature(s) of the light emitting diodes. Current sources are configured to provide the light emitting diodes with respective load currents in accordance with corresponding control signals received by the current sources. First and second modulator units are configured to generate the control signals which are modulated such that a time average value of each control signal corresponds to the value of a corresponding input signal of the respective sigma-delta modulator. A calibration circuit is configured to provide the input signals dependent on a color signal defining the desired color and dependent on the temperature signal.

16 Claims, 10 Drawing Sheets

US 9,237,624 B2

LED DRIVER WITH COMPENSATION OF THERMALLY INDUCED COLOR DRIFT

This application claims priority to European Patent Application 11182843, which was filed Sep. 27, 2011 and is incorporated herein by reference.

TECHNICAL FIELD

The invention relates to the field of driver circuits for light emitting diodes (LEDs), especially for use in multi-color LED applications.

BACKGROUND

The brightness of light emitting diodes (LEDs) is directly dependent on the load current flowing through the diode. To vary the brightness of a LED it is known to use a controllable current source that is set to a current representing a desired brightness. In digitally controlled applications a digital-to-analog converter (DAC) may be used to set the current of the controllable current source.

Since the human eye cannot resolve high frequency brightness fluctuations of approximately 100 hertz or higher, it is known to supply the LED with a pulse width modulated (PWM) current of sufficient frequency. In this case the human eye low-pass filters the resulting pulse width modulated brightness of the LED, i.e., the eye can only sense a mean brightness that depends on the mean LED current which is proportional to the duty cycle of the pulse width modulation. Consequently only the mean current through a LED is relevant to the brightness perceived by the human eye.

It is known to combine light of different colors (e.g., red, green and blue) each having variable brightness to generate nearly any color sensation in the visible spectrum of light. In modern illumination systems or displays a combination of at least three LEDs of different colors are used to provide a multi-color illumination. The LED-triples may be arranged in a matrix-like structure thus forming a display where each "pixel" of the display is represented by a LED-triple typically comprising a red, a green and a blue LED. To vary the color of a pixel, the brightness of the different LEDs has to be individually adjustable. Each of the three LEDs may therefore be driven by a pulse-width modulated current signal of a sufficient high frequency, for example 400 hertz.

However, the resolution requirements are quite high for modern illumination systems or displays. That is, the brightness of a single LED should be adjustable to at least 4,096 different brightness values which corresponds to a brightness resolution of 12 Bit. When using pulse width modulation for controlling the brightness, a time resolution of approximately 600 nanoseconds has to be provided in order to be able to resolve a PWM period of, for example, 2.5 milliseconds (corresponds to 400 hertz) with 12 bits. This entails the need for very fast switching currents with all the known problems coming therewith. Particularly, the electromagnetic compatibility (EMC) is low when switching currents with rise and fall times in the sub-microsecond range.

Further, the brightness of each individual LED is subject to a thermal drift which leads to a respective color drift in a multi-color application. Varying the current in response to a temperature variation to compensate for the effects of the temperature drift is not satisfying since the wavelength of the color of a single LED may vary in response to a changing LED current. Thus, a very complex brightness control would be necessary in multi-color LED systems since the color has to be corrected when changing the brightness of a three LED pixel.

Generally, there is a need for an alternative concept for driving LEDs and multi-color LED-arrangements, particularly for LED drivers that provide an improved color stability over a wide temperature rage.

SUMMARY OF THE INVENTION

A circuit arrangement for driving a multi-color LED arrangement is disclosed, wherein the multi-color LED arrangement includes is composed of at least a first and a second light emitting diode emitting light of different colors and arranged adjacent to each other for additive color mixing to provide a desired color. In accordance with one example of the invention the circuit arrangement includes a temperature sensing circuit configured to provide a digital temperature signal representing the temperature(s) of the light emitting diodes. The circuit arrangement further includes a current source for each light emitting diode configured to supply the light emitting diodes with respective load currents in accordance with corresponding control signals received by the current sources. A first and a second modulator unit are configured to generate the control signals which are modulated such that the time average value of each control signal corresponds to the value of a corresponding input signal of the respective sigma-delta modulator. Finally, the circuit arrangement includes a calibration circuit that is configured to provide the input signals dependent on a color signal defining the desired color and dependent on the digital temperature signal.

Furthermore, a method for driving a multi-color LED arrangement is disclosed. Such multi-color LED arrangement includes at least a first light emitting diode and a second light emitting diode which emit light of different colors. The LEDs are arranged adjacent to each other for additive color mixing to provide a desired color. The method comprises: generating a temperature signal representing the temperature(s) of the light emitting diodes; and supplying, to each light emitting diode, load currents regulated in accordance with corresponding control signals. The method further includes generating modulated signals as control signals which are modulated such that the time average value of each control signal corresponds to the value of a corresponding input signal. The input signals are provided dependent on a color signal defining the desired color and dependent on the temperature signal using a look-up table.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 7b is a block diagram of a circuit arrangement which is an alternative to the arrangement of FIG. 7a;

DETAILED DESCRIPTION OF ILLUSTRATIVE EMBODIMENTS

Figure 1:
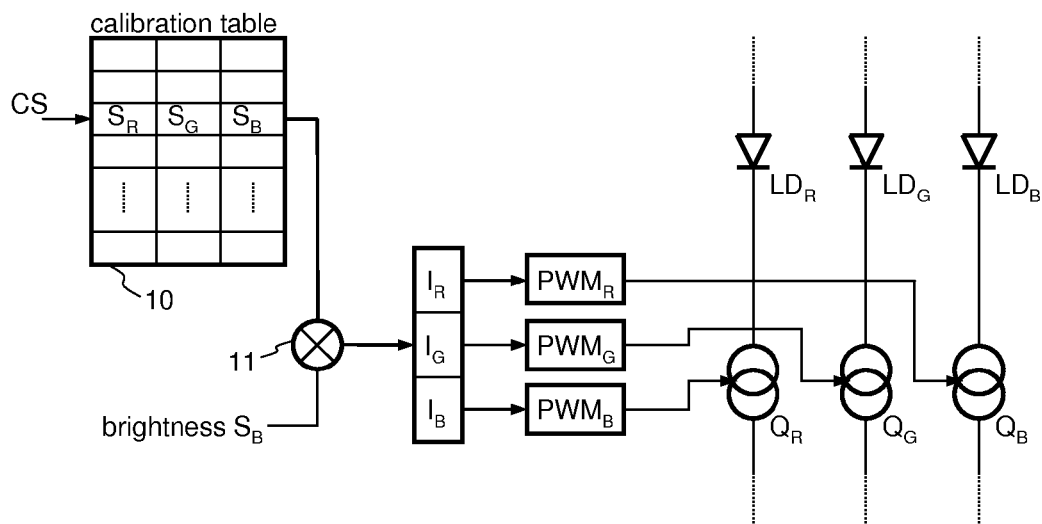
FIG. 1 is a block diagram of a LED driver circuit for driving multi-color LEDs.

FIG. 1 illustrates a LED driver circuit for driving a LED triple, where each LED has a different color. Such LED triples can be—if adequately controlled—used for generating any color of the visible spectrum by means of additive mixture of colors. For this purpose a red LED $LD_R$, a green LED $LD_G$ and a blue LED $LD_B$ are used. In some application a white LED is added as a fourth LED to form a LED quadruple. However, dependent on the application two different LEDs of different colors may be sufficient for color mixing. For controlling the brightness of each LED $LD_R$, $LD_G$, $LD_B$ each LED is connected in series to a respective controllable (in the present example switchable) current source $Q_R$, $Q_G$ and $Q_B$. If, for example, yellow light is to be generated, then the load current through the red LED $LD_R$ has to be zero and the load currents through the green LED $LD_G$ and the red LED $LD_R$ have to be approximately equal, where the absolute current value depends on the desired brightness of the yellow light.

However, the wavelength of the light emitted by the LEDs will vary dependent on the actual value of the load current passing through the LEDs. This dependency entails a change in hue when changing the load current for adjusting the brightness value. To avoid this effect, switchable current sources $Q_R$, $Q_G$, $Q_B$ may be used whereby each one is controlled by a pulse width modulated (PWM) control signal. The hue of the LEDs does not change since the brightness value is not adjusted by continuously adjusting the value of the load currents but by adjusting the duty cycle of the PWM control signal while keeping the current amplitude essentially constant. The "averaging" of the PWM signal is performed by the human eye.

In the exemplary driver circuit of FIG. 1 the hue is selected by a pointer CS that identifies an entry of a calibration table 10 where the corresponding load current values $S_R$, $S_G$, $S_B$ for the three LEDs are stored. The stored values $S_R$, $S_G$, $S_B$ are calibrated for maximum brightness and are multiplied (multiplier 11) with a brightness value $S_{BR}$ for a reduced brightness. The resulting desired average current values $I_R = S_R \cdot S_{BR}$, $I_G = S_G \cdot S_{BR}$, $I_B = S_B \cdot S_{BR}$ are fed to the pulse width modulators $PWM_R$, $PWM_G$, $PWM_B$ that generate a respective PWM control signal having the desired average value for driving the LEDs.

In digitally controlled systems the desired average current values $I_R$, $I_G$, $I_B$ are typically provided as 8, 10, 12 or 16 bit words. The repetition frequency of the PWM pulses is typically 400 Hz which is high enough that the human eye does not sense any flickering. However, PWM frequencies ranging from 100 Hz to 600 Hz or even more (several kHz) are commonly used for this purpose. As already discussed above, a very fast switching of the load currents is necessary for providing the desired resolution of e.g., 12 bits which entails, for example, EMC problems.

Figure 2:
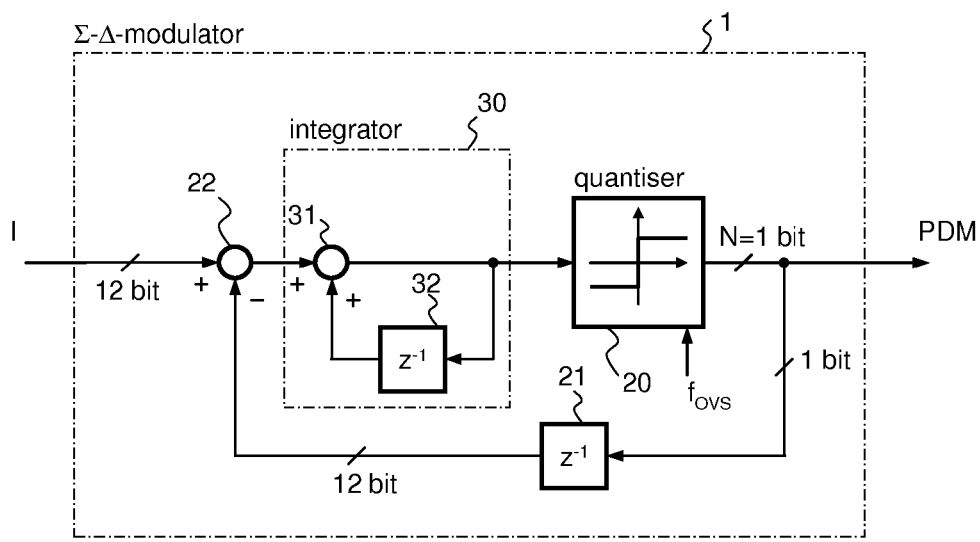
FIG. 2 is a block diagram of a digital sigma-delta modulator providing a pulse-density modulated output signal.

FIG. 2 illustrates a sigma-delta modulator 1 ($\Sigma$-$\Delta$ modulator, often also denoted as delta-sigma modulator) for providing a pulse density modulated signal PDM for driving a LED LD, respectively the corresponding switchable current source Q. A pulse density modulated signal is a generally non periodic bit-stream with an average value corresponding to the input signal, i.e., the desired average load current I in the present example. In the present example the input signal I (i.e., the desired average LED current) is a sequence of 12 bit words. The bit-stream is a sequence of equally spaced bits, i.e., a high level represents a binary "1" and a low level a binary "0." The density of "1"-bits in the pulse density modulated signal is high if the level of the input signal of the sigma-delta modulator is high and vice versa. However, the length of one bit-symbol ("1" or "0") is always the same and is equal to the period of the bit-rate. For example at a bit-rate of 40 kHz, the length of one bit-symbol is 25 μs.

The sigma-delta modulator 1 comprises a forward path comprising an integrator 30 and a quantizer 20. It further comprises a feedback path comprising a delay element 21. The delay element 21 receives the 1-bit output signal PDM[k] of the quantizer 20 and provides the signal at its output delayed by a sample and as a 12 bit word, i.e., the bit value of the 1-bit input signal of the delay element 21 is copied to the most significant bit of the respective output signal. "k" thereby is a time index. The delayed output signal PDM[k−1] is subtracted (subtractor 22) from the input signal I[k] and the resulting difference I[k]−PDM[k−1] is supplied to the integrator 30 that has its output connected to the quantizer 20.

In the present example the integrator 30 is a standard first-order digital integrator with a delay element 32 in a feedback path and an adder 31. The transfer function of the integrator in the z-domain is $1/(1-z^{-1})$. However, higher order integrators may also be applied. The quantizer 20 may be a simple comparator element (1-bit quantizer). In the present example the quantizer provides the most significant bit of its 12-bit input signal value at its output. However, also multi-bit quantizer 20 are applicable for providing an N-bit output PDM signal which is a stream of N-bit words, i.e., a set of N "parallel" bit-streams. For example, at each sampling time a 3-bit quantizer quantizes the value of its input signal to one of eight discrete output values, namely "000," "001," "010," . . . , "110," "111" (or 0, . . . , 7 in decimal numbers), i.e., the 3-bit quantizer provides a stream of 3 bit words.

For proper operation of the sigma-delta modulator 1 the input signal has to be strongly over-sampled. Then the quantization noise is "shifted" towards higher frequencies an can therefore be removed by a simple low-pass filtering which is—in the present case—advantageously performed by the human eye. The noise shaping properties of sigma delta modulators (also called "MASH modulators," MASH being short for "multi-stage noise shaping") is well known and not further discussed here. For a bandwidth of the input signal $I_R$ of 400 Hz an over-sampling frequency of 40 kHz is sufficient to provide an signal-to-noise ratio ($SNR_{dB}$) of at least 74 dB which corresponds to an effective resolution of 12 bits. The effective number of bits (ENOB) may be calculated as $$ENOB=(SNR_{dB}-1.76)/6.02, \quad (1)$$

whereby the signal-to-noise ratio $SNR_{dB}$ may be calculated as $$SNR_{dB}=6.02N+1.76-5.17+30 \log_{10}(OSR) \quad (2)$$

for a sigma-delta modulator 1 with a first order integrator 30, an over-sampling rate OSR (ratio of sampling rate and bandwidth) and a N-bit quantizer 20 (N=1 in the present example). For a sigma-delta modulator 1 with a second order integrator 30 the signal-to-noise ratio $SNR_{dB}$ is given by $$SNR_{dB}=6.02N+1.76-12.9+50 \log_{10}(OSR). \quad (3)$$

From the discussion above it can be seen, that at a given resolution, for example 12 bit, and moderate frequencies of about 40 kHz a sigma-delta modulator provides a pulse-density modulated output signal, i.e., a bit-stream, which may be used for controlling the current sources $Q_R$, $Q_G$, $Q_B$ connected to the LEDs $LD_R$, $LD_G$, $LD_B$ in a LED driver circuit such as the circuit of FIG. 1.

For a stable operation within the desired resolution the sigma-delta modulator may comprise an anti-aliasing filter for limiting the bandwidth of its input signal to a predefined bandwidth of, for example, 400 Hz.

Compared to the circuit of FIG. 1, which uses PWM modulators for driving the LEDs, the rise time and the fall time of the switching can be allowed to be much longer when using a sigma-delta modulator instead, since the bit-stream comes at relatively low frequencies of about 40 kHz while providing the same effective resolution. Longer rise and fall times entail less electromagnetic interferences (EMI) and a better electromagnetic compatibility (EMC).

An alternative implementation of the sigma-delta-modulator of FIG. 2 is shown further below in FIG. 11 (see modulator 1 in FIG. 11). It should be noted that the sigma-delta modulators may be implemented using discrete components or using a programmable device executing appropriate software.

Figure 3:
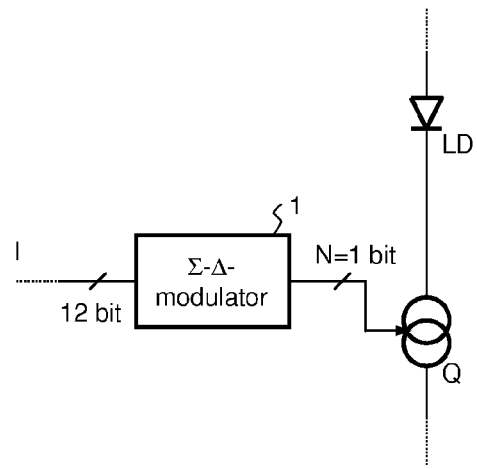
FIG. 3 is a block diagram of a LED driver circuit comprising the sigma-delta modulator of FIG. 2.

FIG. 3 illustrates the application of a sigma-delta modulator (e.g., the modulator of FIG. 2) in a LED driver circuit. Only one LED LD connected in series to one current source Q is depicted in FIG. 3. However, the circuit of FIG. 3 may be tripled to form a driver circuit for three LEDs $LD_R, LD_G, LD_B$ of different colors analogously to the circuit of FIG. 1. Further, it should be noted that the LED LD may also represent a series circuit including a plurality of LEDs (sometimes referred to as LED chain). The sigma-delta modulator 1 receives a desired average current value I and provides a corresponding bit-stream which is a pulse-density modulated control signal supplied to the switchable current source Q. The input signal I of the sigma-delta modulator 1 may be derived from a calibration table as illustrated in the exemplary circuit of FIG. 1 (and also in FIGS. 6, 13, 15 and 16).

Figure 4:
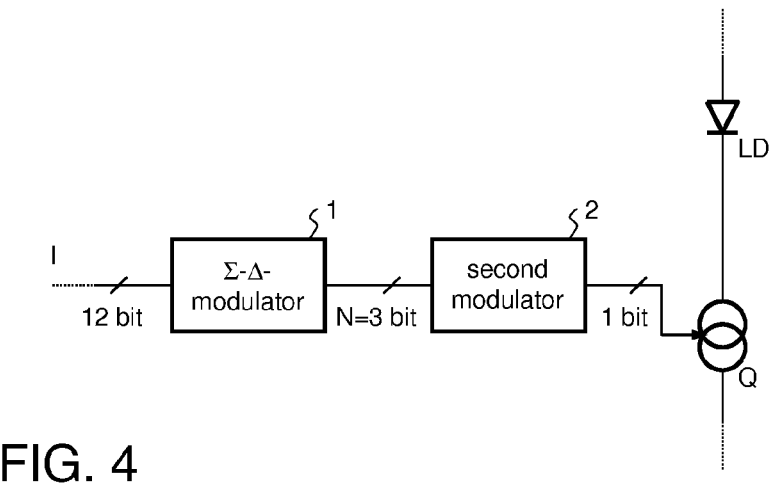
FIG. 4 is a block diagram of a LED driver circuit comprising a sigma-delta modulator followed by a second modulator.

FIG. 4 illustrates another example of how to apply a sigma delta modulator in a LED driver circuit. This example is especially useful when using a sigma-delta modulator 1 with a multi-bit quantizer 20, e.g., a 3-bit quantizer or a 3-bit analog-to-digital converter. In this exemplary case the quantizer (cf. reference symbol 20 in FIG. 2) does not only distinguish between two discrete values "0" and "1" but between eight discrete values "000," "001," "010," "011," "100," "101," "110," and "111," i.e., "0" to "7" in the decimal numbers. The sigma-delta modulator 1 therefore does not provide a single bit output signal PDM but a stream of 3-bit words, i.e., three parallel bit-streams representing a stream of numbers 0 to 7. For transforming this three bit-streams into one control signal for driving the current source Q a second modulator 2 may be employed, for example, a pulse-width modulator (PWM) or a pulse frequency modulator (PFM). In the present example a PWM is used as second modulator. In contrast to the example of FIG. 1 the PWM needs only to resolve 8 different positions (i.e., 3 bits) in time during the PWM period of, for example, 25 μs (i.e., the sampling time of the sigma-delta-modulator). As a consequence the steepness of the switching edges may be lower by a factor of five due to the sigma-delta modulator 1 arranged upstream to the pulse width modulator while maintaining or even increasing the resolution. Alternatively a 3-bit digital-to-analog converter may be used as second modulator 2. In this case the sigma-delta modulator 1 arranged upstream to the digital-to-analog converter (DAC) has the advantage that a low resolution DAC is sufficient. Compared to the circuit of FIG. 3 the present example allows for even slower switching frequencies which may be advantageous in case the connection between the LED and the driver circuit comprises long cables. Furthermore switching losses are lower.

Figure 5:
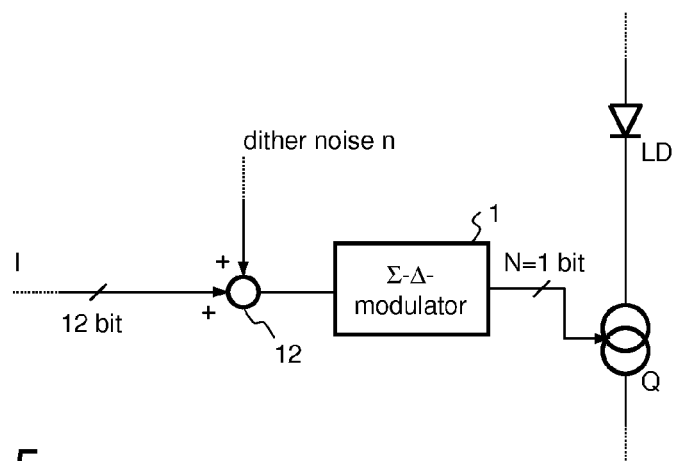
FIG. 5 is a block diagram of a LED driver circuit corresponding to FIG. 3 but with a dither noise added to the input for preventing limit cycles.

When modulating a constant input signal I, the pulse density modulated output signal of the sigma-delta modulator 1 (bit-stream) may exhibit some periodicity. This undesired effect is due to limit cycles and due to the spectrum of the bit-stream which may have so-called idle-tones, i.e., peaks at certain discrete frequencies. To avoid the idle tones a low power noise signal n[k] having zero mean and, for example, a triangular or a rectangular probability density function may be added to the input signal I as depicted in FIG. 5 by means of an adder 12. This technique is also referred to as "dithering." Due to the noise-shaping properties of sigma-delta modulators 1 the power is of the dither noise n[k] is "shifted" towards higher frequencies that cannot be resolved by the human eye. That is, the human eye performs a low-pass filtering of the bit-stream. The dithering technique results in a lower signal-to-noise ratio but, however, the desired resolution of the sigma-delta modulator can be achieved regardless of the lower signal-to-noise ratio. Furthermore, the idle tones are suppressed and the undesired periodicity of the bit-stream is destroyed. It should be noted, that the concept of dithering may be used in combination with any sigma-delta modulator described herein or depicted in the figures.

Figure 6:
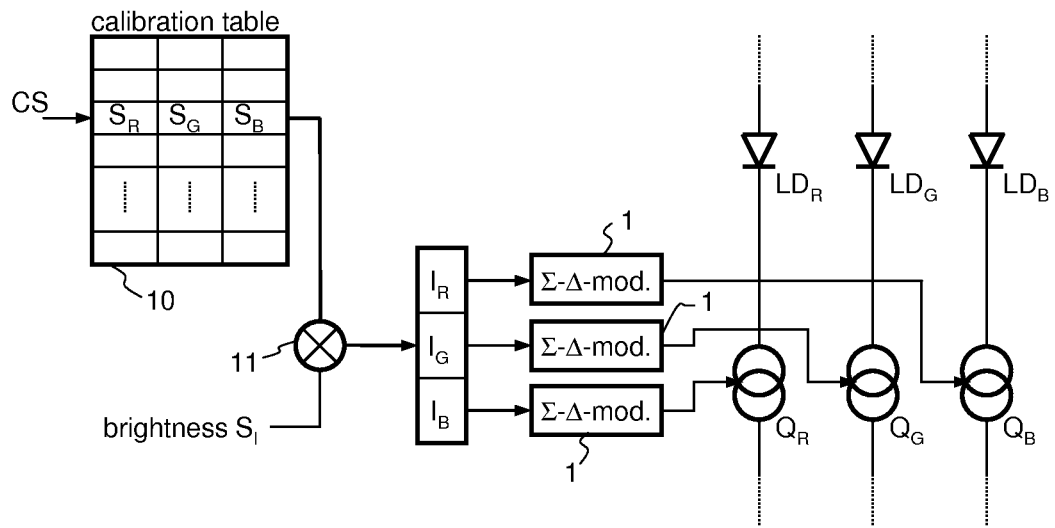
FIG. 6 is a block diagram of a LED driver circuit for driving multi-color LEDs with a sigma-delta modulator comprising three times the driver circuit of FIG. 3.

FIG. 6 illustrates, by means of a block diagram, a LED driver circuit for driving multi-color LEDs with a sigma-delta modulator 1, wherein the LED driver circuit includes three times the driver circuit of FIG. 3. Of course driver circuits with a sigma-delta modulator 1 having a second modulator connected downstream thereof as depicted in FIG. 4 are also applicable for building up a multi-color LED driver. In the present example one driver circuit according to FIG. 3 is employed for each color channel (red, green and blue). Furthermore a dither noise may be added to the input signals $I_R$, $I_G$, $I_B$ of each color channel as discussed with reference to FIG. 5. Apart from the sigma-delta modulator 1 the further components of the multi-color LED driver circuit correspond to the components of the circuit discussed with reference to FIG. 1. For less sophisticated applications, two channels with only two LEDs of different colors may be sufficient. In other applications even a fourth channel may be used comprising, for example, a white LED for additional brightness control.

Figure 7A:
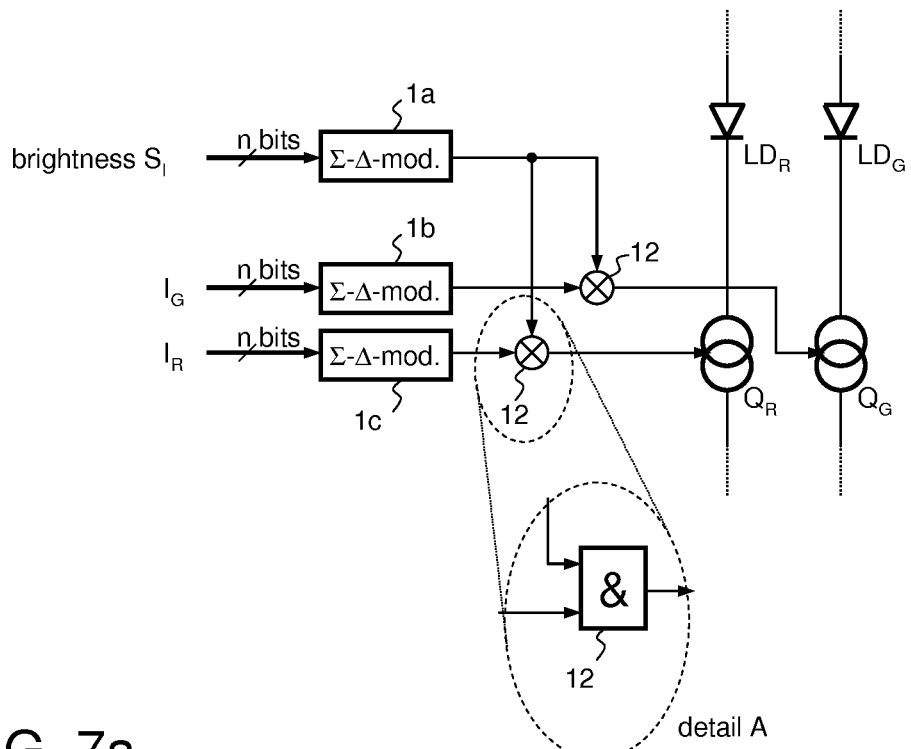
FIG. 7a is a block diagram of a circuit arrangement with two LEDs of different color an respective driver circuits for additive color mixing and brightness control.

FIG. 7a illustrates, by means of a block diagram, an alternative driver circuit for driving multi-color LEDs $LD_R$, $LD_G$ with sigma-delta modulators 1b, 1c. As in the example of FIG. 6 each one of at least two LEDs $LD_R$ and $LD_G$ is connected with a respective controllable current source $Q_R$ and $Q_G$ such that the load currents of the light emitting diodes $LD_R$, $LD_G$ depend on respective control signals received by the current sources $Q_R$, $Q_G$. Examples for controllable current sources that may be employed for the present purpose are below with respect to FIGS. 9 and 10. The control signals by which the load current through the LEDs $LD_R$, $LD_G$ is set are bit-streams generated by sigma delta modulators 1b, 1c analogous to the example of FIG. 3. The bit-streams depend on input signals $I_R$, $I_G$ of the respective sigma-delta modulator 1c, 1b, whereby the mean value of each bit-stream corresponds to the value of the respective input signal $I_R$, $I_G$ as already explained above. The value of the input signals may be obtained from a calibration table as illustrated with respect to FIGS. 1 and 6 (and also FIGS. 13 and 15). Different from the example of FIG. 6 the present example employs a different way of brightness control. A further sigma delta modulator 1a is supplied with brightness signal $S_I$ specifying a desired overall brightness of the LEDs present in the circuit arrangement. The analog or digital brightness signal $S_I$ is thus also transformed into a bit-stream whose mean value represents the desired brightness. The bit-streams generated by the other modulators 1b, 1c, which define the effective color of the LEDs, are multiplied (multiplication units 12) with the brightness bit-stream for adjusting the brightness of the LEDs independently from the color. Compared to the example of FIG. 6 the multiplication of two bit-streams (e.g., output streams of modulators 1a and 1c or, respectively, modulators 1a and 1b) as shown in FIG. 7a may implemented by employing a simple AND-Gate (see FIG. 7a, magnified detail A) as multiplication unit 12, whereas an n-bit multiplier 11 as required in the example of FIG. 6 is much more complex to implement.

However, the implementation according to the example of FIG. 7a may produce unwanted artifacts, if the two bit-streams to be multiplied are strongly correlated which may be the case when idle-tones (cf. description of FIG. 5) occur. In order to overcome this problem, dither noise may be added to the input signals of the respective modulators (e.g., modulators 1a, 1b, 1c) as illustrated in FIG. 5. Another possibility is to place one of the two modulators whose output bit-streams are to be multiplied (e.g., modulator 1b and, respectively, modulator 1c) downstream of the AND-gate 12 as illustrated in FIGS. 7b and 7c.

Figure 7B:
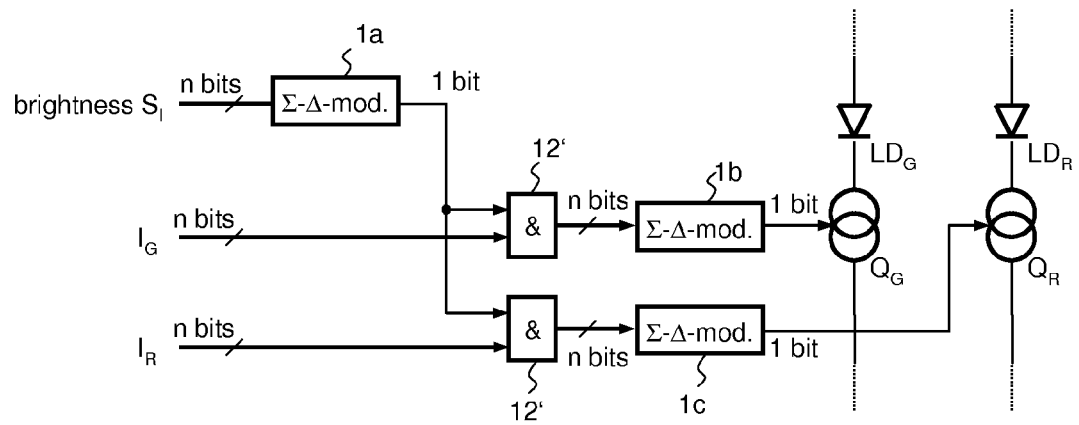

FIG. 7b illustrates the above-mentioned multiplication of brightness value $S_I$ with the color values $I_G$ and $I_R$ respectively. The ratio $I_G/I_R$ defines the effective color. Of course the arrangement of FIG. 7b can be extended by adding a third LED $LD_B$ of a different color thus allowing for generation of an arbitrary color by additive color mixing. The brightness value $S_I$ and the color values $I_G$, and $I_R$ are multi bit words, e.g., words of 8 bits, 10 bits, 12 bits, or even 16 bits corresponding to binary number that represents a brightness or color value, respectively. Compared to FIG. 7a, in the arrangement of FIG. 7b the modulators 1b, 1c for modulating the n-bit color values $I_R$, $I_G$ are disposed downstream of the multiplier unit 12 (implemented as AND-gates). The m-bit brightness value $S_I$ is, however, modulated (modulator 1a) before multiplication. The multiplier unit 12' of FIG. 7b thus receives a serial stream of single bits representing the brightness, and (in each clock cycle) a serial stream of words representing the a color values (e.g., $I_G$ or $I_R$ in the present example), each word being composed of n (parallel) bits. The multiplication yields, as a result, a stream of n-bit words representing the desired value of the respective mean load current of the corresponding LED $LD_G$ (and $LD_R$, respectively). In each clock cycle the actual n-bit word of each stream (representing $I_G \cdot S_I$ and $I_R \cdot S_I$) of n-bit words is received by the further modulator 1b and 1c, respectively, that again modulates the n-bit word yielding a bit-stream of single bits. The resulting bit-streams are used to drive the respective controllable current source $Q_G$ and $Q_R$.

Figure 7C:
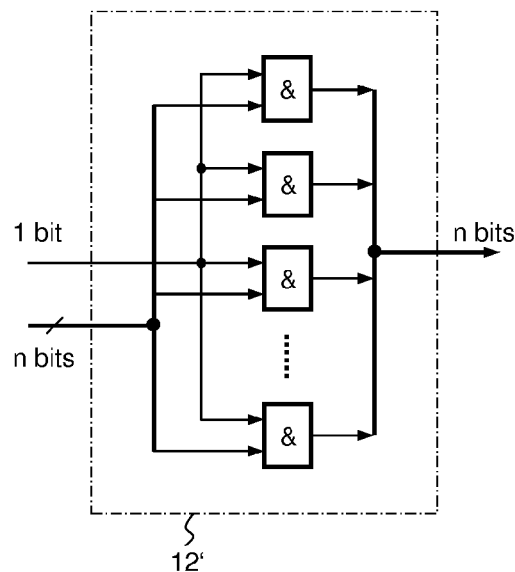
FIG. 7c illustrates a circuit detail of the circuit of FIG. 7b.

The implementation of the multiplier unit 12' is illustrated in FIG. 7c. The multiplier unit is implemented as an arrangement of a number of n AND-gates. Each single AND-gate receives the output bit-stream (1 bit each clock period) and one of the n bits of the n bit word ($I_G$ or $I_R$ in the example of FIG. 7b) representing the color. The n AND-combined output bits of the n AND gates are combined to form a n-bit word at the output of the multiplier unit 12'.

Figure 8A:
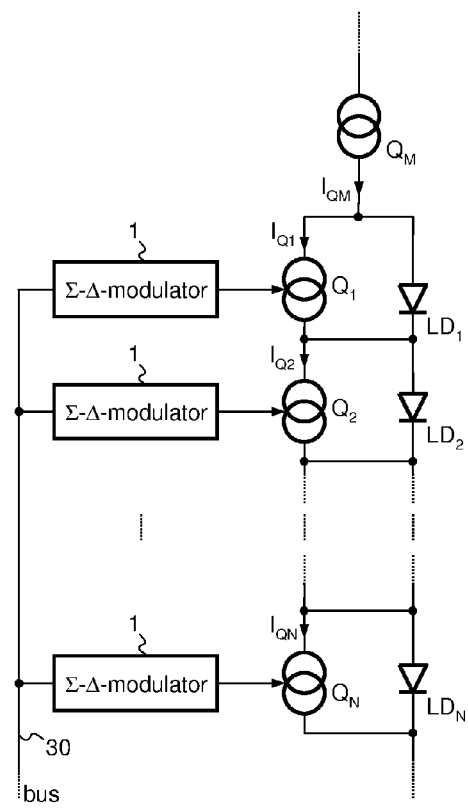
FIG. 8a is a block diagram of a further LED driver circuit, where the load current passing through a LED is controlled by means of a bypass current source.

FIG. 8a illustrates another driver circuit for driving a plurality of light emitting diodes $LD_1, LD_2, \ldots, LD_N$. However, the driver circuit of FIG. 8a may be employed for driving at least two light emitting diodes $LD_1, LD_2$. The driver circuit comprises a main current source $Q_M$ providing a main current $I_{QM}$. A plurality (e.g., three for LEDs of three different colors) of bypass current sources $Q_1, Q_2, \ldots, Q_N$ are connected in series to the main current source $Q_M$ and have terminals for connecting one light emitting diode $LD_1, LD_2, \ldots LD_N$ in parallel to each bypass current source $Q_1, Q_2, \ldots, Q_N$. Each bypass current source $Q_1, Q_2, \ldots, Q_N$ drives a bypass current $I_{Q1}, I_{Q2}, \ldots, I_{QN}$.

Each bypass current source $Q_1, Q_2, \ldots, Q_N$ and the respective light emitting diode $LD_1, LD_2, \ldots LD_N$ form a parallel circuit, wherein all these parallel circuits are connected in series.

A sigma-delta modulator 1 is connected to each bypass current source $Q_1, Q_2, \ldots, Q_N$ and configured to control the respective bypass current $I_{Q1}, I_{Q2}, \ldots, I_{QN}$ passing through the respective bypass current source $Q_1, Q_2, \ldots, Q_N$. As a result, the effective load current $I_{LD1}$, that passes through a certain light emitting diode $LD_1$ of the plurality of light emitting diodes, equals to the difference between the main current $I_{QM}$ and the respective bypass current $I_{Q1}$, that is:

$$I_{LDi} = I_{QM} - I_{Qi},$$

whereby i is an index ranging from 1 to N denoting the number of the bypass current source $Q_i$ driving the bypass current $I_{Qi}$ and the light emitting diode $LD_i$ with the load current $I_{LDi}$.

Similar to the examples of FIGS. 3, 4 and 5 the brightness of each single LED $LD_i$ may be adjusted to a desired value by appropriately controlling the bypass currents $I_{Qi}$ and thus the load currents $I_{LDi}$ by means of the sigma-delta modulators 1.

Each sigma delta-modulator 1 may comprise an digitally addressable bus interface, for example a serial bus interface for connecting a serial bus 30. The desired current or brightness value may be received from the bus 30 as a binary word. For multi-color illumination the brightness values may be taken from a calibration table as illustrated in the example of FIG. 1. Of course the sigma-delta modulators 1 of the present example may be followed by a second modulator 2, e.g., a pulse-width modulator, as discussed with reference to FIG. 4.

Figure 8B:
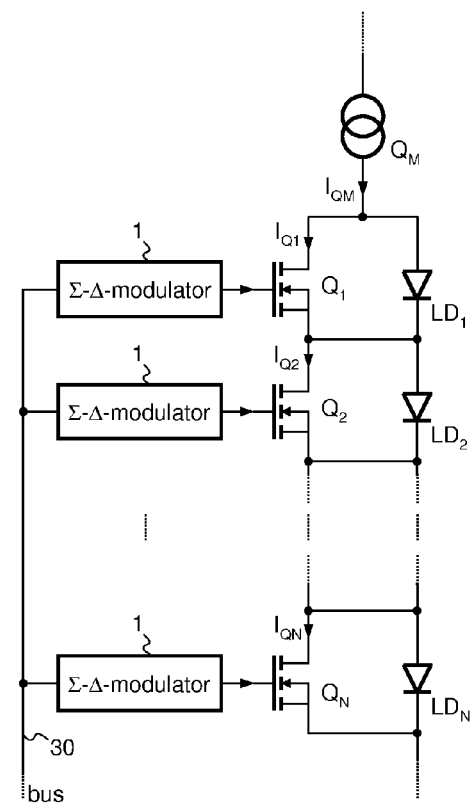
FIG. 8b is a block diagram of the LED driver of FIG. 8a where MOS transistors operate as switchable bypass current sources.

FIG. 8b illustrates an example similar to the example of FIG. 8a, where semiconductor switches, i.e., transistors, e.g., MOSFETs, are employed as bypass current sources $Q_i$. Except of the bypass current sources the example of FIG. 8b is identical to the example of FIG. 8a.

In multi-color applications, for example an illumination device comprising a red LED $LD_1$, a green LED $LD_2$ and a blue LED $LD_3$, and a driver circuit as shown in FIGS. 8a and 8b, the color generated by mixing the light of the different LEDs may be adjusted by appropriately adjusting the brightness of each single LED $LD_1$, $LD_2$, $LD_3$ by means of the sigma-delta modulators 1. Additionally, the overall brightness may be adjusted by varying the main current $I_{QM}$. The main current source $Q_M$ may also be controlled by a sigma-delta modulator analogous to the bypass current sources $Q_1$ to $Q_N$.

Figure 9:
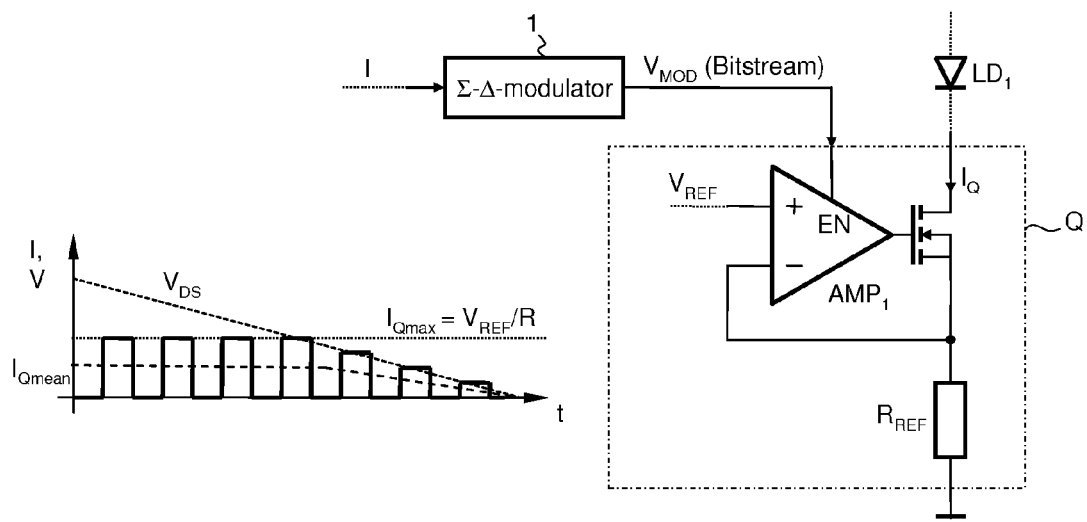
FIG. 9 is a block diagram illustrating the current source of the driver circuit of FIG. 3 in more detail.

FIG. 9 illustrates one exemplary embodiment of the controllable current source of FIG. 3 in more detail. As in the example of FIG. 3, a desired current value I (which might be a digital or an analog value) is supplied to an input of a sigma-delta-modulator 1 that provides a pulse-density modulated control signal $V_{MOD}$ at its output, wherein the mean value of the pulse-density modulated control signal $V_{MOD}$ equals the desired current value I. This pulse-density modulated control signal $V_{MOD}$ is supplied to a control input EN of the controllable current source Q that provides a pulse-density modulated current value $I_Q$ having a mean value $I_{Qmean}$ and a maximum value $I_{Qmax}$. During normal operation of the current source, the mean value $I_{Qmean}$ of the current $I_Q$ is directly proportional to the desired current value I, i.e., the mean current $I_{Qmean}$ of the current source can be set by means of the desired (analog or digital) current value I. The advantages of a pulse density controlled current source compared to known pulse-width modulated current sources have already been discussed above.

However, an implementation of current sources as illustrated in FIG. 3 or, in more detail, in FIG. 9 may have some shortcomings which become clear when looking at an actual implementation of the controllable current source as, for example, shown in FIG. 9. The output current $I_Q$ of the current source Q is provided by a transistor $T_1$; in the present example the output current is the drain current of a MOSFET. The maximum amplitude of the output current $I_{Qmax}$ is set by means of a reference voltage $V_{REF}$, a shunt resistor $R_{REF}$ and an amplifier $AMP_1$. The reference voltage $V_{REF}$ is provided to a first input of the amplifier $AMP_1$, which is, in the present example, an operational amplifier, and a feedback voltage $R_{REF} \cdot I_Q$ is supplied to a second input of the amplifier $AMP_1$. The shunt resistor $R_{REF}$ is connected in series to the transistor $T_1$ such that the output current $I_Q$ of the current source flows through the shunt resistor $R_{REF}$ and thus generates a voltage drop $R_{REF} \cdot I_Q$ across the shunt resistor proportional to the output current $I_Q$. The output of the amplifier $AMP_1$ is supplied to a control electrode of the transistor $T_1$ which is the gate electrode of the MOSFET in the present example. With the implementation of the current source Q of FIG. 9 the output current IQ is controlled to be proportional to the reference voltage $V_{REF}$, wherein, in the present example, the factor of proportionality is $1/R_{REF}$. In order to enable a modulation of the output current $I_Q$ the amplifier $AMP_1$ has a control input ("enable" input EN). The logic level of the pulse-density modulated control signal control signal $V_{MOD}$ enables (i.e., switches on) or disables (i.e., switches off) the controllable current source, such that the mean output current $I_{Qmean}$ corresponds to the desired current value I.

The above discussion concerning the function of the circuit of FIG. 9 did not consider the influence of the voltage drop across the load current path (i.e., the drain-source voltage $V_{DS}$) of the transistor $T_1$. As long as the voltage drop $V_{DS}$ across the transistor $T_1$ is above a certain threshold the transistor $T_1$ operates in its saturation region and its load current $I_Q$ (i.e., the output current of the current source Q) is independent from said voltage drop $V_{DS}$. But in an environment of varying supply voltages as, for example, in automotive applications, the voltage drop across the transistor may fall below the above mentioned threshold and the transistor $T_1$ starts to operate in its linear region which entails that the output current $I_Q$ is no longer independent from the voltage drop $V_{DS}$ but decreasing proportional with a decreasing voltage drop $V_{DS}$ across the load current path of the transistor $T_1$. As a consequence, the mean output current $I_{Qmean}$ is no longer proportional to the desired current value I as supplied to the input of the modulator 1, i.e., the mean value $I_{Qmean}$ of the output current of the current source Q is no longer controllable by the input I of the Σ-Δ-modulator 1, but dependent on external effects as might be, for example, a varying supply voltage provided by an automotive battery. This adverse effect can also be seen in the timing diagram on the left side of FIG. 9.

Figure 10:
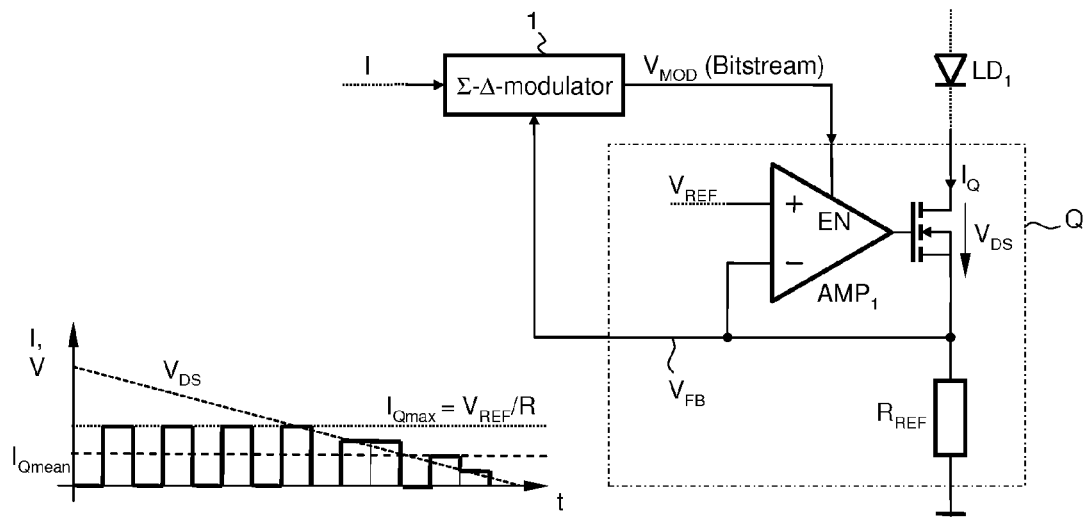
FIG. 10 is a block diagram illustrating a driver circuit similar to the circuit of FIG. 3 wherein the sigma-delta modulator receives an additional current feedback.

The above-described deficiency of the circuit of FIG. 9 can be overcome by the circuit of FIG. 10 illustrating one example of the present invention. The circuit of FIG. 10 is essentially the same as the circuit of FIG. 9 except an additional feedback loop. According to the present example, a feedback signal ($I_Q \cdot R_{REF}$) that represents the output current of the current source is fed back to the modulator 1. If the mean output current $I_{Qmean}$ of the current source Q changes due to undesired external effects, the modulator 1 adjusts its modulated control signal $V_{MOD}$ for controlling the current source Q such that the mean output current $I_{Qmean}$ remains stable at its desired valued which is set by the value of the input signal I of the modulator 1. Due to the additional feedback loop, the adverse external effects may be compensated for. In the present example, the pulse density of the PDM control signal provided by the modulator 1 and supplied to the current source Q is increased if the mean output current $I_{Qmean}$ of the current source Q decreases due to a decreasing voltage drop $V_{DS}$ across the load current path of the transistor $T_1$. The effect of a low drain-source voltage $V_{DS}$ is thus compensated for. This effect of this exemplary embodiment of the invention can be seen by comparing the timing diagrams of FIGS. 9 and 10.

Figure 11:
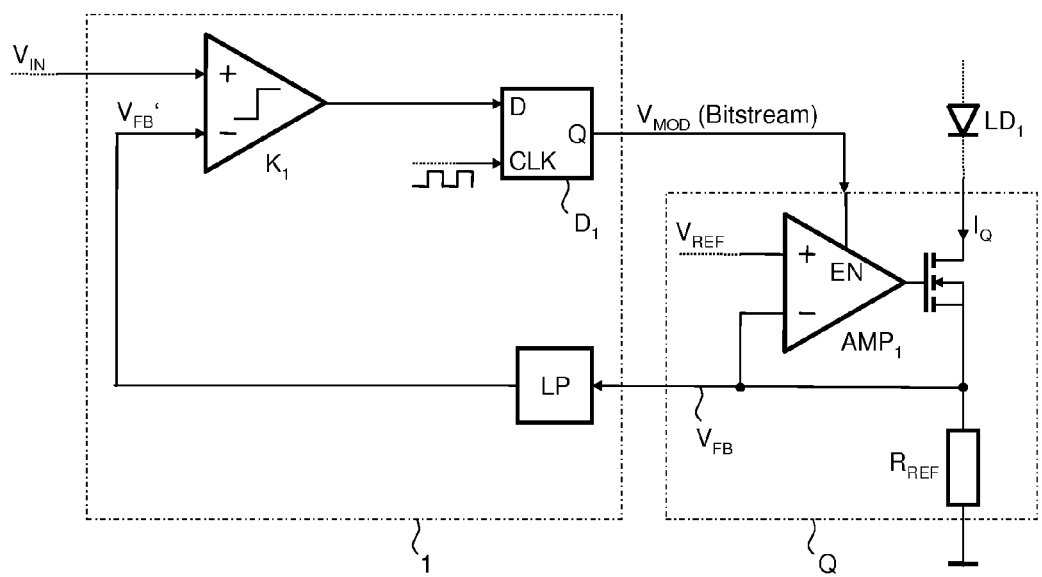
FIG. 11 is a block diagram illustrating one exemplary realisation of the circuit if FIG. 10.

FIG. 11 illustrates another example of the invention. The circuit of FIG. 11 is an exemplary practical embodiment of the basic circuit of FIG. 10. In essence, an example of the modulator 1 of FIG. 10 is illustrated in more detail. The exemplary modulator 1 of FIG. 11 comprises a comparator $K_1$, a latch $D_1$, and a low-pass filter LP. The comparator $K_1$ receives at its inputs an input signal $V_{IN}$ representing a desired mean current value (corresponds to symbol I in the example of FIG. 10) and a current feedback signal $V_{FB}'$ which is a low-pass filtered signal representing the mean output current $I_{Qmean}$ of the current source Q connected to the modulator 1 in the same way as in the example of FIG. 10. In the present embodiment the feedback signal $V_{FB}'$ is generated by low-pass filtering the voltage drop $V_{FB} = I_Q \cdot R_{REF}$ across the shunt resistor $R_{REF}$ of the current source Q. The cut-off frequency of the low-pass filter LP is chosen such that the output of the filter represents the mean value of its pulse-density modulated input signal. If the input signal $V_{IN}$ (representing the desired mean current) is greater than the feedback signal $V_{FB}'$ (representing the actual mean value of the output current $I_Q$) the comparator $K_1$ outputs a high level, and if the input signal $V_{IN}$ is lower than the feedback signal $V_{FB}'$ it outputs a low level. The comparator output is supplied to a data-input of the latch $D_1$, i.e., a D-latch in the present example. A clock signal is supplied to a clock input of the D-latch, and the output of the latch is connected to the control input EN of the current source Q, i.e., the latch provides as an output signal the pulse density modulated control signal $V_{MOD}$ for controlling the current source Q.

The example of FIG. 11 illustrates the function of the exemplary modulator 1 by means of a circuit diagram. It is evident that the same function may be also be implemented in a different way, for example, by means of a micro-controller or a digital signal processor. In such a digital implementation the voltage drop $I_Q \cdot R_{REF}$ would be digitised by means of an analog-to-digital converter and the low-pass LP might be implemented as a digital (FIR or IIR) filter. As an alternative, the sigma-delta modulator of FIG. 2 may be used instead the present modulator 1 which provides substantially the same function.

The current sources of FIGS. 10 and 11 can usefully employed within the driver circuits for driving light emitting diodes as illustrated in FIGS. 3 to 6. Especially in multi-color LED applications, where the desired color is set by additive color mixing of red, green and blue light emitted by three different LEDs, a precise controllable mean load current $I_{Qmean}$ for the LEDs is useful for a precise setting of the color.

As already mentioned above, the wavelength of the light emitted by a LED may vary due to a varying load current amplitude. For this reason, the load current amplitude is maintained at a constant value and the brightness is adjusted by switching the load current on and off in accordance with a pulse-width modulated, a pulse-frequency modulated, or a pulse-density modulated control signal so as to stabilize the color point and avoid variations of hue in multicolor LED arrangements. However, the luminous intensity of the emitted light generated by a LED may also vary due to a changing temperature. This temperature-dependency is different for LEDs of different color as can be seen from the top diagram of FIG. 12. For this reason, the calibration table 10 as illustrated in the examples of FIGS. 1 and 6 is only valid for a reference temperature (e.g., 25° Celsius). Within a narrow temperature range around the reference temperature, the changes of the resulting color (due to a change of the intensity of one LED contributing to the color) might be negligible. However, the color drift may be a significant problem when the multi-color LED arrangement should be operable in a wide temperature range such as, e.g., from −25° C. to 75° C. which is a usual specification of the operating temperature for LED displays used outside.

Figure 12:
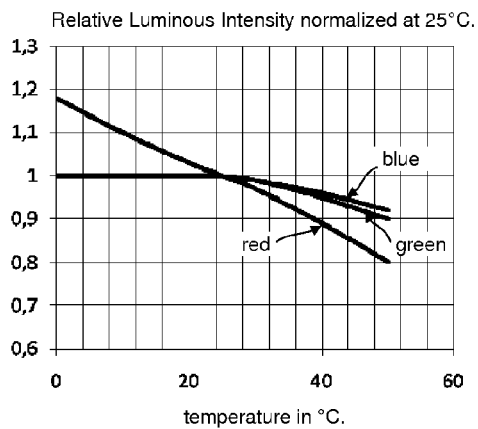
FIG. 12 is a timing diagram illustrating the temperature induced drift for LEDs of different color.
Figure 12:
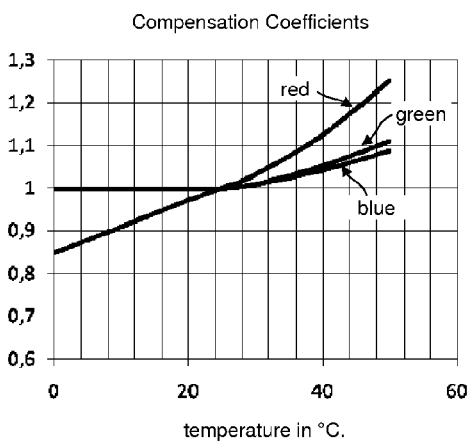
Figure 12:
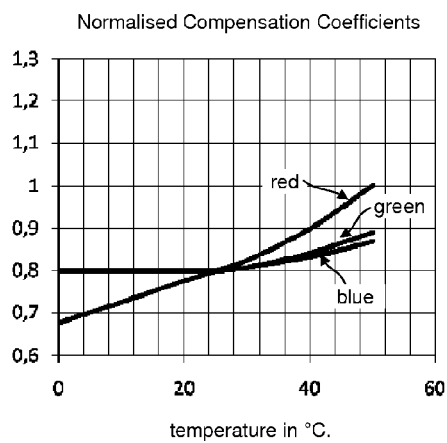

The numbers stored in the calibration table 10 are the desired average LED currents $S_R$, $S_G$, $S_B$ (for a red, green and blue LED, respectively) required to achieve a specific color output (identified by the pointer CS) at the reference temperature. For temperatures other than the reference temperature the calibration table may be "adjusted" by multiplying the numbers stored in the table 10 with appropriate (temperature-dependent) compensation coefficients. The bottom left diagram of FIG. 12 illustrates the compensation coefficients for the red, green and blue channel. For the reference temperature (25° C. in the present example) the compensation coefficients are unity. For different temperatures the desired load current values stored in the table are multiplied by the coefficient corresponding to the respective color. As the coefficients in the table are usually calculated for a maximum LED brightness and thus for a maximum current, the compensation coefficients have to be normalized such that the maximum compensation coefficient is unity. The normalized compensation coefficients are illustrated in the bottom right diagram of FIG. 12 which is a scaled version of the left diagram of FIG. 12.

The example already explained with reference to FIG. 6 may be enhanced by eliminating the effects of thermally induced color drifts. For this purpose a compensation table is provided (e.g., binary numbers stored in an non-volatile memory) which contains the normalized compensation coefficients for different temperatures as depicted in FIG. 12. For example, three compensation coefficients ($C_R$, $C_G$, $C_B$) for the red, green and blue channel, respectively, may be stored for different temperatures throughout the considered temperature range (e.g., from 0° C. to 50° C. in steps of 1°). The actual LED temperature of the LEDs $LD_R$, $LD_G$, $LD_B$ is measured and the respective compensation coefficients are determined using the compensation table 10'. The coefficients $C_R$, $C_G$, $C_B$ whose associated temperature value matches best with the measured LED temperature. Further, (e.g., linear) interpolation may be performed within the table to obtain compensation coefficients $C_R$, $C_G$, $C_B$ for temperatures which are not enlisted in the table.

The desired current values $S_R$, $S_G$, $S_B$ stored in the calibration table 10 are multiplied with the corresponding compensation coefficients $C_R$, $C_G$, $C_B$ obtained from the compensation table (e.g., by looking them up in the table or by interpolation) and may further be multiplied by a brightness value $S_I$ which may vary, e.g., between zero and unity. The results of the multiplication are the desired average load currents $I_R$, $I_G$, $I_B$ supplied to the modulators 1, that is $I_R = S_R \cdot C_R \cdot S_I$, $I_G = S_G \cdot C_G \cdot S_I$, and $I_B = S_B \cdot C_B \cdot S_I$. The modulated control signals supplied to the corresponding current sources $Q_R$, $Q_G$, $Q_B$ may be the same as in the examples of FIGS. 1 and 6. However, any type of modulator may be used for driving the switchable current sources of the LEDs in connection with the compensation of the thermally induced color drift described herein.

Figure 14:
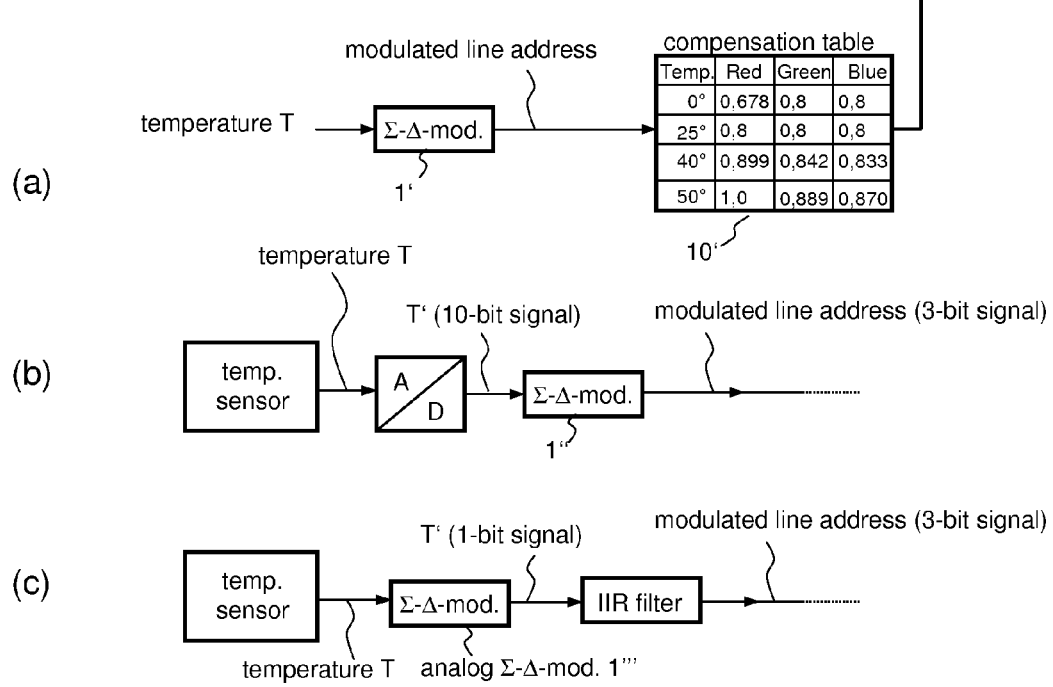
FIG. 14 illustrates one modification of the example of FIG. 13 which allows efficient interpolation of compensation coefficients.

FIG. 14 illustrated a particular method that provides an efficient way of interpolating compensation coefficients $C_R$, $C_G$, $C_B$ for temperature values not listed in the compensation table 10'. Referring to FIG. 14a, the measured or calculated temperature value T representing the temperature of the LEDs is also modulated using a (digital or analog) sigma-delta modulator 1' and the corresponding modulated temperature signal T' may represent $2^n$ (n=2 in the present example for four different colors) different temperature values which actually stored in the compensation value. The average of the modulated temperature signal T' is equal to the temperature T actually measured. The modulated signal may, however, be used for addressing a corresponding entry of compensation coefficients $C_R$, $C_G$, $C_B$ in the compensation table 10'. The average value of the compensation coefficients match with the measured temperature T. As an example it is assumed that the compensation table 10' only has four entries as illustrated in FIG. 14a. Further, let the measured temperature be 27.5° C. The modulated signal may then be 11 (corresponding to 50° C.) for 3% of the time, 10 (corresponding to 40° C.) for 21% of the time, 01 (corresponding to 25° C.) for 70% of the time, and 00 (corresponding to 0° C.) for 6% of the time, wherein 00, 01, 10, and 11 are addresses corresponding to temperatures of 0° C., 25° C., 40° C., and 50° C. for addressing the corresponding line of the compensation table 10'. As a result the compensation coefficients have the values associated with a temperature of 0° C. for 6% of the time, of 25° C. for 70% of the time, of 40° C. for 21% of the time, and of 50° C. for 3% of the time, thus providing—on average—compensation coefficients $C_R$, $C_G$, $C_B$ associated with a temperature of 27.5°

C. The example of FIG. 16 includes a similar interpolation for a compensation table 10' including entries for eight different temperatures (3 bit temperature resolution).

In the example of FIG. 14a the modulator may be an analog sigma-delta modulator 1' for digitizing an analog temperature signal T into an (over sampled) stream of 2-bit words (for addressing four different temperatures in the table). As can be seen from FIG. 14b the sigma-delta-modulator 1' may include a conventional analog-to-digital converter (e.g., providing a 10-bit digital temperature signal) followed by a digital sigma-delta modulator 1" which provides at its output a stream of (generally) m-bit words (m=2 in the example of FIG. 14a, m=3 in the example of FIG. 16).

Referring to FIG. 14c, the (digital or analog) sigma-delta modulator 1' may be configured to provide a bit stream (1-bit signal) whose time average represents the modulator input signal. To obtain a m-bit signal for addressing a defined number (e.g., 4, 8, 16, 32, etc.) of temperature values in the table 10' the bit-stream may be filtered using an appropriate digital filter which is configured to provide an appropriate (and correspondingly down-sampled) stream of m-bit words (m=2, 3, . . . ) which may be provided to address the correct line in the table 10 for selecting the appropriate compensation coefficients. Generally the digital filter has a low-pass characteristics, i.e., provides a moving (weighted) average of the input signal at its output. The digital filter may be, e.g., implemented as IIR or FIR filter.

The components illustrated in FIGS. 14b and 14c may be included in the examples of FIGS. 13, 14a, 15 and 16. That is, any sigma-delta modulator may include—where appropriate—a digital filter at its output. Further, any sigma-delta modulator may be implemented to receive a digitized analog signal and perform a digital sigma-delta modulation or to receive an analog signal and to directly sigma-delta modulate that analog signal.

Figure 13:
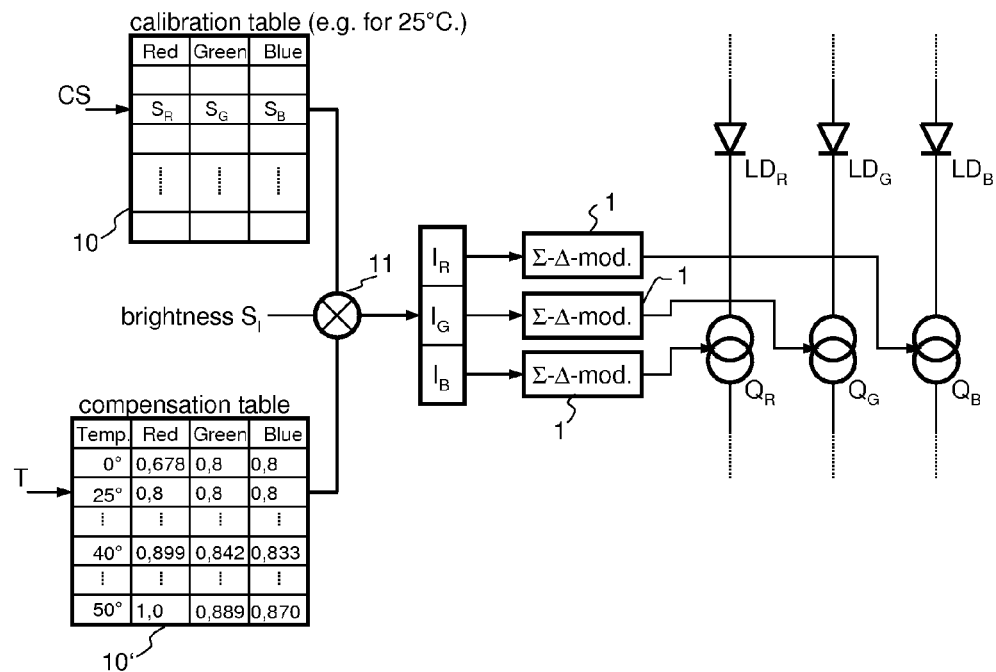
FIG. 13 is a block diagram of a LED driver circuit for driving multi-color LEDs with a sigma-delta modulator wherein circuit provides for compensation of temperature induced brightness drift of the LEDs using a table of compensation coefficients.
Figure 15:
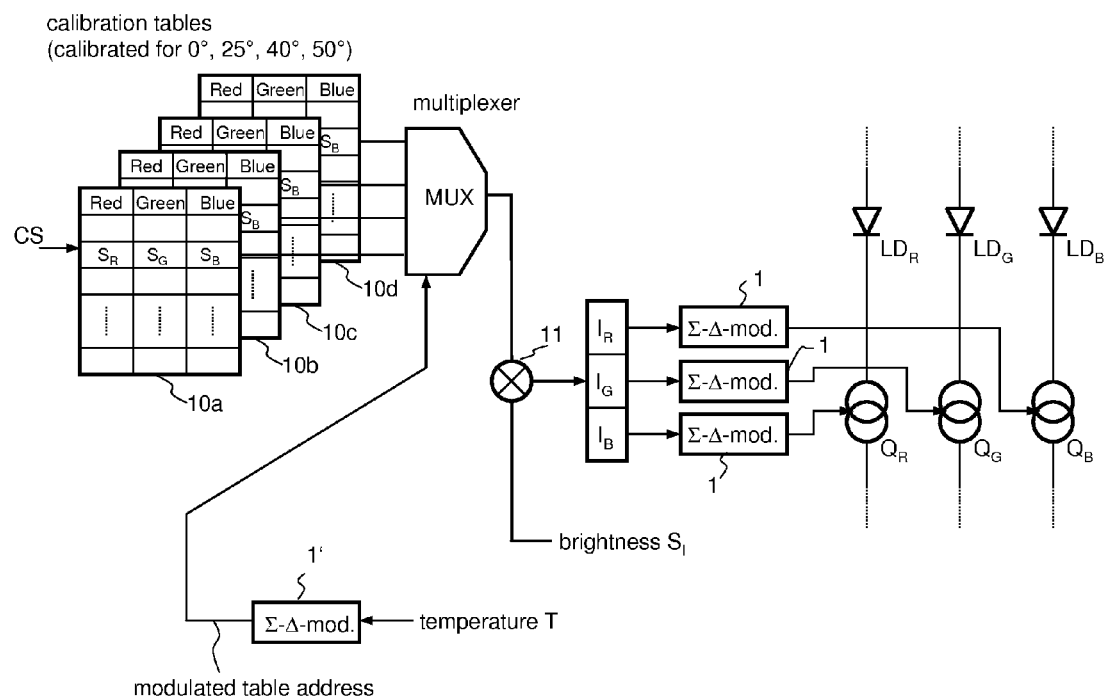
FIG. 15 is a block diagram of a LED driver circuit for driving multi-color LEDs with a sigma-delta modulator wherein circuit provides for compensation of temperature induced color drift of a multi-color LED arrangement using a set of tables of compensation coefficients.

FIG. 15 illustrates an alternative to the example of FIG. 13 providing essentially the same function. In this example the compensated desired load current values, i.e., the products $S_R \cdot C_R$, $S_G \cdot C_G$, and $S_B \cdot C_B$ are pre-calculated and stored in a separate calibration table, each calibration table 10a, 10b, 10c, 10d, etc. is calibrated for a specific temperature (e.g., 0° C., 25° C., 40° C., 50° C.). The "correct" calibration table may be selected dependent on a measured LED temperature T. This selection is symbolized by the multiplexer MUX in FIG. 15. As only a limited number of different calibration tables 10a, 10b, 10c, 10d can be provided for a limited number of temperatures an efficient way of interpolating table values for an arbitrary (measured) temperature value T is desirable. Similar to the concept of the arrangement of FIG. 13, the actually measured temperature value T (digitized with e.g., 10 bits) is modulated using a sigma-delta modulator 1' thus generated a modulated (e.g., 2-bit) temperature signal T' which—on average—equals the measured temperature T.

Similar to the example explained in connection with FIG. 14 a temperature of 27.5° C. may be modulated such that the modulated signal represents 50° C. (address 11) for 3% of the time, 40° C. (address 10) for 21% of the time, 25° C. (address 01) for 21% of the time, and 0° C. (address 00) for 6% of the time. In contrast to the example of FIG. 13 the modulated temperature signal is not used to select the appropriate set of compensation coefficient but rather to select the appropriate calibration table as a whole. That is, the appropriate triple $S_R$, $S_G$, $S_B$ is selected in accordance of the modulated temperature signal T' each period of the sigma-delta modulator 1'. The selected triple $S_R$, $S_G$, $S_B$ may then be multiplied (e.g., using a multiplier 12 as illustrated in FIG. 7c) with the (e.g., also sigma-delta modulated) brightness signal $S_I$. As a result the three desired LED currents $I_R$, $I_G$, $I_B$ are obtained and further processed as in the examples of FIG. 1, 3 to 11, or 13. It should be noted, that the parts of the circuit not explained in detail are essentially the same as in the example of FIGS. 13 and 6.

Figure 16:
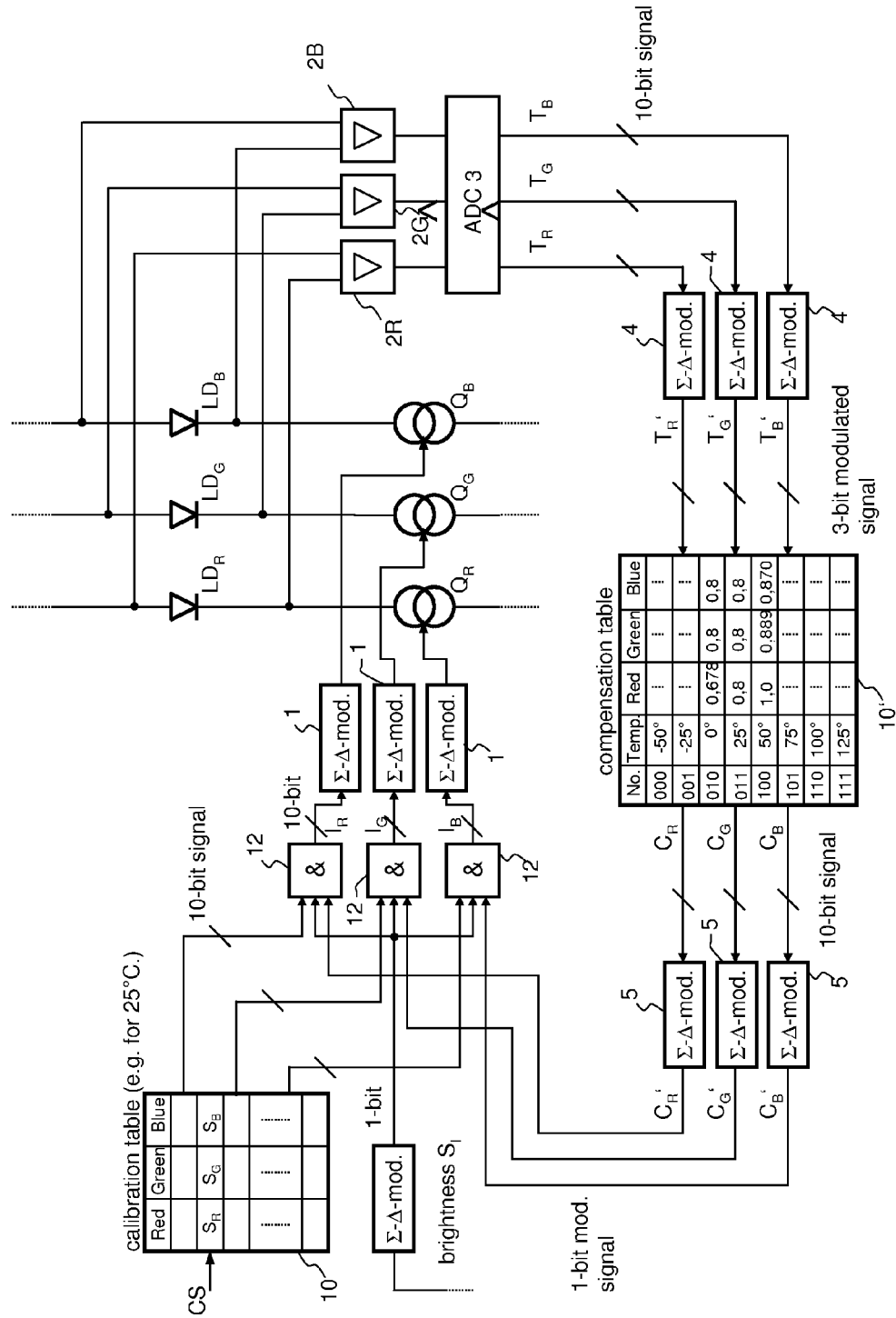
FIG. 16 is a block diagram illustrating the example of FIG. 13 in more detail.

FIG. 16 illustrates the example of FIG. 13 in more detail. In particular the temperature measurement is shown. The rest of the circuit is essentially a combination of the examples of FIG. 13 and FIG. 7b. The calculated desired average load current values $I_R$, $I_G$, $I_B$ are supplied to the sigma delta-modulators 1 whose output signals control the switched current sources $Q_R$, $Q_G$, and $Q_B$, respectively. Each current source $Q_R$, $Q_G$, $Q_B$ supplies a modulated load current $i_R$, $i_G$, $i_B$ to the corresponding LED $LD_R$, $LD_G$, $LD_B$ (or LED chains). Amplifiers 2R, 2G, 2B are coupled to the LEDs $LD_R$, $LD_G$, $LD_B$ such that the temperature dependent forward voltages $u_R$, $u_G$, $u_B$ are amplified. The forward voltages $u_R$, $u_G$, $u_B$ are digitized (10 bit multi-channel analog-to-digital converter 3) wherein the digitized forward voltages may be regarded as digital temperature signals $T_R$, $T_G$, and $T_B$. The measured forward voltage may be subject to an analog or digital pre-processing not shown in the figure for the sake of brevity. However, such pre-processing can be any usual signal processing appropriate in connection with temperature measurement using silicon diodes. The 10 bit temperature signals $T_R$, $T_G$, $T_B$ are modulated as illustrated in the example of FIGS. 14 and 15. In the present example the temperature signals are modulated using the sigma-delta modulators 4 which provide (over-sampled) modulated temperature signals each temperature signals being, for example, a stream of 3-bit words.

As already explained with reference to FIG. 14 the digital (3-bit) temperature values $T_R'$, $T_G'$, $T_B'$ are used as address pointers to retrieve a corresponding set of compensation coefficients $C_R$, $C_G$, $C_B$ from the compensation table 10'. Accordingly, the value $T_R'$ is used to determine the corresponding coefficient $C_R$ from the column labeled "Red," the value $T_G'$ is used to determine the corresponding coefficient $C_G$ from the column labeled "Green," and the value $T_B'$ is used to determine the corresponding coefficient $C_B$ from the column labeled "Blue." In the present example the table 10' includes eight different lines (labeled 000, 001, . . . , 111) corresponding to eight different temperature values (−50° C., −25° C., . . . , 125° C.). The compensation coefficients may be, e.g., 10-bit words as the calibration values $S_R$, $S_G$, $S_B$ stored in the calibration table 10.

The calibration table 10 may include one line per color. For example, a color of 12 bit would result in 4,096 lines and, correspondingly, 4,096 different sets of calibration values $S_R$, $S_G$, $S_B$. When using the RGB color space each column (red, green, blue) may be addressed separately with the color value of the respective color. In this case the table may contain only 256 calibration values (8 bits) for each color channel for a color depth of 24 bits. The calibration values obtained from the calibration table 10 may be, e.g., 10-bit words.

The calibration values $S_R$, $S_G$, $S_B$ (e.g., 10-bit words), a modulated brightness value $S_I'$ (1-bit over-sampled) and the modulated compensation coefficients $C_R'$, $C_G'$, $C_B'$ (1-bit over-sampled) are multiplied, e.g., using the AND gates 12 which form a multiplier as illustrated in FIG. 7c. The resulting products are the desired load average current values $I_R$, $I_G$, $I_B$ mentioned above.

Finally, it should be noted, that any alternative temperature sensing method may be used instead of sensing the forward voltage of the LEDs. Further, the applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The Applicant indicates that aspects of the present invention may consist of any such individual feature or combination of features. In view of the foregoing description it will be evident to a person skilled in the art that various modifications may be made within the scope of the invention.

Although examples of the present invention have been described herein in detail, it is desired, to emphasis that this has been for the purpose of illustrating the present invention and should not be considered as necessarily limitative of the invention, it is being understood that many modifications and variations can be made by those skilled in the art while still practicing the invention claimed herein.

What is claimed is:

1. A circuit arrangement comprising:
   a temperature sensing circuit configured to provide a temperature signal representing temperature(s) of a plurality of light emitting diodes emitting light of different colors arranged adjacent to each other for additive color mixing to provide a desired color, wherein the temperature sensing circuit includes a sigma-delta-modulator configured to generate a stream of bits or digital words whose time average represents the sensed temperature(s), the stream of bits or digital words forming the temperature signal;
   a current source for each light emitting diode of the plurality of light emitting diodes, current sources configured to provide the light emitting diodes with respective load currents in accordance with corresponding control signals received by the current sources;
   a first modulator unit and a second modulator unit configured to generate the control signals which are modulated such that a time average value of each control signal corresponds to the value of a corresponding input signal of the respective modulator unit; and
   a calibration circuit configured to provide the input signals dependent on a color signal defining the desired color and dependent on the temperature signal, wherein the calibration circuit includes a lookup table unit including color calibration data for different discrete temperature values, the lookup table unit is configured to provide a set of calibration data selected dependent on the temperature signal, the input signals of the modulator units being responsive to the selected set of calibration data.

2. The circuit arrangement of claim 1, further comprising the plurality of light emitting diodes.

3. A circuit arrangement comprising:
   a temperature sensing circuit configured to provide a temperature signal representing temperature(s) of a plurality of light emitting diodes emitting light of different colors arranged adjacent to each other for additive color mixing to provide a desired color;
   a current source for each light emitting diode of the plurality of light emitting diodes, current sources configured to provide the light emitting diodes with respective load currents in accordance with corresponding control signals received by the current sources;
   a first modulator unit and a second modulator unit configured to generate the control signals which are modulated such that a time average value of each control signal corresponds to the value of a corresponding input signal of the respective modulator unit; and
   a calibration circuit configured to provide the input signals dependent on a color signal defining the desired color and dependent on the temperature signal, wherein the calibration circuit includes a lookup table unit including color calibration data for different discrete temperature values, the lookup table unit is configured to provide a set of calibration data selected dependent on the temperature signal, the input signals of the modulator units being responsive to the selected set of calibration data.

4. The circuit arrangement of claim 3, wherein the lookup table unit comprises:
   a calibration table including selectable calibrated current values for the light emitting diodes associated with a defined color value, the current values being calibrated for a reference temperature and the selection of the calibrated current values being based on the color signal; and
   a compensation table including selectable compensation coefficients, each coefficient being associated with one LED and a discrete temperature value, the selection of the compensation coefficients being based on the temperature signal;
   wherein the calibrated current values are combined with the respective compensation coefficients to provide, as calibration data, corresponding current values recalibrated for the sensed temperature(s).

5. The circuit arrangement of claim 4, wherein the calibration circuit further includes:
   sigma-delta-modulators configured to generate a bitstream corresponding to each compensation coefficient, the time average of each bit-stream representing the respective compensation coefficient; and
   a multiplier configured to multiply the bit streams representing the compensation coefficients with the calibrated current values obtained from the calibration table, the multiplier providing the calibration data.

6. The circuit arrangement of claim 5, wherein the multiplier is configured to receive as further multiplying factor a bit stream whose time average represents a brightness value.

7. The circuit arrangement of claim 3, wherein the lookup table unit comprises a calibration table including selectable calibrated current values for the light emitting diodes associated with a defined color value, the current values being calibrated for a plurality of different temperatures and the selection of the calibrated current values being based on the color signal and on the temperature signal.

8. The circuit arrangement of claim 3, further comprising the plurality of light emitting diodes.

9. A method for driving a multi-color LED arrangement including a plurality of light emitting diodes emitting light of different colors and arranged adjacent to each other for additive color mixing to provide a desired color, the method comprising:
   generating a temperature signal representing temperature(s) of the light emitting diodes, wherein generating the temperature signal comprises
      providing a sense signal representing temperature(s) of one or more light emitting diodes, and
      sigma-delta modulating the sense signal thus generating a stream of bits or digital words, whose time average represents the sensed temperature(s), to provide the temperature signal;
   supplying, to each light emitting diode, load currents regulated in accordance with corresponding control signals;
   generating modulated signals as the control signals which are modulated such that a time average value of each control signal corresponds to a value of a corresponding input signal; and
   providing the input signals dependent on a color signal defining the desired color and dependent on the temperature signal using a look-up table, wherein the look-up table includes color calibration data for different discrete temperature values, and wherein a set of calibration data is selectable dependent on the temperature signal, the input signals for the sigma-delta modulation being responsive to a selected set of calibration data.

10. The method of claim 9, wherein the sigma-delta modulating comprises:
low-pass filtering the stream of bits or digital words to provide the temperature signal.

11. The method of claim 9, wherein the temperature signal is further provided by low-pass filtering the stream of bits or digital words.

12. A method for driving a multi-color LED arrangement including a plurality of light emitting diodes emitting light of different colors and arranged adjacent to each other for additive color mixing to provide a desired color, the method comprising:
generating a temperature signal representing temperature(s) of the light emitting diodes;
supplying, to each light emitting diode, load currents regulated in accordance with corresponding control signals;
generating modulated signals as the control signals which are modulated such that a time average value of each control signal corresponds to a value of a corresponding input signal; and
providing the input signals dependent on a color signal defining the desired color and dependent on the temperature signal using a look-up table, wherein the look-up table includes color calibration data for different discrete temperature values, and wherein a set of calibration data is selectable dependent on the temperature signal, the input signals being responsive to a selected set of calibration data.

13. The method of claim 12, wherein the look-up table comprises:
a calibration table including selectable calibrated current values for the LEDs associated with a defined color value; the current values being calibrated for a reference temperature and the selection of the calibrated current values being based on the color signal; and
a compensation table including selectable compensation coefficients, each coefficient being associated with one LED and a discrete temperature value, the selection of the compensation coefficients being based on the temperature signal;
wherein the calibrated current values are combined with the respective compensation coefficients to provide, as calibration data, corresponding current values recalibrated for sensed temperature(s).

14. The method of claim 13, wherein providing the input signals using the look-up table comprises:
generating a bit-stream corresponding to each compensation coefficient using sigma-delta modulation, a time average of each bit-stream representing the respective compensation coefficient; and
using a multiplier to multiply the bit streams representing the compensation coefficients with the calibrated current values obtained from the calibration table, thus providing the calibration data.

15. The method of claim 14, wherein the multiplier receives as further multiplying factor a bit stream whose time average represents a brightness value.

16. The method of claim 15, wherein the look-up table comprises a calibration table including selectable calibrated current values for the LEDs associated with a defined color value, the current values being calibrated for a plurality of different temperatures and the selection of the calibrated current values being based on the color signal and on the temperature signal.

* * * * *